United States Patent [19]  
Riew

[11] 4,274,994  
[45] Jun. 23, 1981

[54] REACTIVE TERMINALLY UNSATURATED LIQUID POLYMERS IN UNSATURATED POLYESTERS

[75] Inventor: Changkiu K. Riew, Akron, Ohio

[73] Assignee: The B. F. Goodrich Company, Akron, Ohio

[21] Appl. No.: 159,088

[22] Filed: Jun. 13, 1980

Related U.S. Application Data

[62] Division of Ser. No. 73,160, Sep. 6, 1979.

[51] Int. Cl.$^3$ .............................................. C08L 67/06
[52] U.S. Cl. .................................. 260/40 R; 525/27; 525/39; 525/44; 525/167
[58] Field of Search ................. 260/40 R; 525/27, 39, 525/44, 167

[56] References Cited

U.S. PATENT DOCUMENTS

| 3,431,321 | 3/1969 | De Lapp et al. | 525/44 |
| 3,951,888 | 4/1976 | Isayama et al. | 528/409 |
| 3,983,184 | 9/1976 | Kikuzawa | 525/36 X |
| 4,101,604 | 7/1978 | Rowe | 525/49 X |

Primary Examiner—Earl A. Nielsen  
Attorney, Agent, or Firm—J. Hughes Powell, Jr.

[57] ABSTRACT

Terminally unsaturated liquid epihalohydrin polymers are produced by polymerizing at least one epihalohydrin using acrylic acid or methacrylic acid as a modifier. The polymerization is conducted in the presence of a catalytic amount of a trialkyl oxonium salt of an HMF$_6$ acid wherein M is an element selected from the group consisting of phosphorus, arsenic and antimony. The polymers are useful as tougheners for unsaturated polyester resin systems.

13 Claims, No Drawings

REACTIVE TERMINALLY UNSATURATED LIQUID POLYMERS IN UNSATURATED POLYESTERS

This is a division, of application Ser. No. 073,160, filed Sept. 6, 1979.

BACKGROUND OF THE INVENTION

The prior art teaches preparation of trialkyl oxonium salts of $HMF_6$ wherein M is an element selected from the group consisting of phosphorous, arsenic and antimony (U.S. Pat. No. 3,585,227) that are useful as catalysts for preparation of rubbery polyepihalohydrins (U.S. Pat. No. 3,850,857); and, when water or a glycol is employed as a reactant, liquid hydroxyl-terminated epihalohydrin polymers (U.S. Pat. No. 3,850,856). Copolymerizations of epichlorohydrin with glycidyl esters of ethylenically unsaturated acids or ethylenically unsaturated epoxides to produce solid elastomers which contain vinyl unsaturation have been disclosed previously in U.S. Pat. Nos. 3,285,870 and 3,158,591. New polymers are desired having an epihalohydrin polymeric backbone but different reactive end groups.

SUMMARY OF THE INVENTION

Terminally unsaturated liquid epihalohydrin polymers having the formula

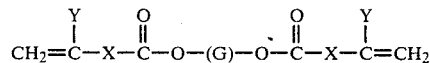

wherein Y is hydrogen or alkyl, X is zero, alkylene or arylene and G is a polymeric backbone comprising units of at least one epihalohydrin, optionally together with at least one other epoxide. Polymers are prepared by polymerization of an epihalohydrin in the presence of an unsaturated carboxylic acid using a catalytic amount of a trialkyl oxonium salt of an $HMF_6$ acid wherein M is an element selected from the group consisting of phosphorous, arsenic and antimony. Unsaturated polyester molding compositions containing these terminally unsaturated polymers have improved toughness when suitably cured, without significant adverse effects on other important properties such as cure rate and strength.

DETAILED DESCRIPTION

This invention discloses novel vinyl terminated polyepihalohydrins of low molecular weight. The polymers may be used as a toughener for unsaturated polyester resin systems.

The prior art described in U.S. Pat. No. 3,850,856 is a process of manufacturing hydroxyl-terminated poly(epichlorohydrins) by cationic polymerization using triethyloxonium hexafluorophosphate (TEOP) as the initiator and in the presence of a controlled amount of water or ethylene glycol.

The invention disclosed herein is a process which differs from the prior art in that the products of this invention are low molecular weight poly(epichlorohydrins) which are not only viscous liquids at room temperature but also contain terminal vinyl groups prepared by polymerizing an epihalohydrin in the presence of a trialkyl oxonium salt of a hexafluorometallic acid catalyst and a controlled amount of an unsaturated carboxylic acid.

The terminally unsaturated liquid epihalohydrin polymers have the formula

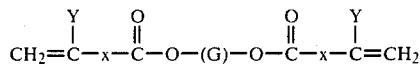

wherein Y is hydrogen or methyl and x is zero (o) an alkylene radical containing 0–10, preferably 0–3 carbon atoms or arylene as phenylene or naphthylene. G is a polymeric backbone comprising units of at least one epihalohydrin, optionally together with at least one other epoxide such as those having the formula

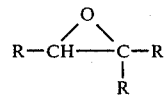

wherein all R radicals are selected from the group consisting of hydrogen, alkyl and alkenyl radicals containing 1 to 10 carbon atoms, more preferably 1 to 5 carbon atoms, alkoxy-alkyl radicals containing 2 to 10 carbon atoms more preferably 2 to 6 carbon atoms, phenoxyalkyl radicals wherein the alkyl group contains 1 to 6 carbon atoms, and phenyl radicals, and at least one of said R radicals is hydrogen. Even more preferably all R radicals are selected from the group consisting of hydrogen and alkyl radicals containing 1 to 3 carbon atoms, and at least one of said R radicals is hydrogen. Examples of suitable epoxides include alkylene oxides such as ethylene oxide, propylene oxide, cis- and trans-but preferably cis-butene-2-oxide, butene-1-epoxide, cis- and trans-pentene-2-oxide, cis- and trans-hexene-2-oxide, cis- and trans-hexene-3-oxide, and the like; phenyl alkylene oxides such as styrene oxide and the like; and glycidyl ethers such as methyl glycidyl ether, ethyl glycidyl ether, methylethylglycidyl ether, butyl glycidyl ether, phenyl glycidyl ether, and the like, normally in amounts up to 50% by weight of these epoxy monomers. Excellent results are obtained with ethylene oxide and propylene oxide. Also, unsaturated glycidyl ethers of the general formula

where R is an ethylenically unsaturated radical such as vinyl, allyl, alkenyl and the like. Typical glycidyl ethers include vinyl glycidyl ether, allyl glycidyl ether, butenyl glycidyl ether, 4-vinylcyclohexyl glycidyl ether, abietylglycidyl ether, cyclohexeneylmethyl glycidyl ether, o-allyl-phenyl glycidyl ether in amounts up to about 20 weight percent of the epoxy monomers. While the unsaturated glycidyl ethers are generally preferred, useful copolymers may also be made with monoepoxides of dienes or polyenes such as butadiene, methylene monoxide, chloroprene monoxide, 3,4-epoxy-1-pentene, 4,6-epoxy-2-hexene, 2-epoxy-5,9-cyclododecadiene, and the like.

Alkylene oxides are preferred "other epoxides," with ethylene oxide, propylene oxide, glycidyl acrylate and methacrylate and allyl glycidyl ether being especially useful. Preferred epihalohydrins are epichlorohydrin and epibromohydrin, with epichlorohydrin being especially useful.

The terminally unsaturated epihalohydrin liquid polymers of the present invention are prepared using the catalyst described in U.S. Pat. Nos. 3,585,227, 3,850,856 and 3,850,857 but in the substantial absence of water or glycol. The catalyst is a trialkyl oxonium salt of a hexfluorometallic acid, $HMF_6$ wherein M is an element selected from the group consisting of phosphorus, arsenic and antimony, such acids being $HPF_6$, $HAsF_6$, and $HSbF_6$. A particularly economical method of preparing these catalysts is described in the aforementioned U.S. Pat. No. 3,585,227. This process entails mixing a solution of an $HMF_6$ acid with a dialkyl ether and an epoxide selected from the group consisting of alkylene oxides and halogen-substituted alkylene oxides. The ether employed in said process determines the alkyl groups present in the oxonium salt and one will select the ether for this purpose. Suitable dialkyl ethers include dimethyl ether, methyl ethyl ether, diethyl ether, dipropyl ether, ethyl propyl ether, di-n-butyl ether, di-n-amyl ether dihexyl ether, di-2-ethyl-hexyl ether and the like.

A preferred catalyst for use in the present process is triethyloxonium hexafluorophosphate (TEOP)

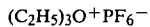

$$(C_2H_5)_3O^+PF_6^-$$

which is an easily handled, stable crystalline salt. The amount of catalyst typically will vary from about 0.001 to about 1.0 weight part, for example, 0.02 to 0.1, per 100 weight parts of epoxide monomer being polymerized. The preferred catalyst amount is from about 0.004 to about 0.025 weight part per 100 weight parts of epoxide monomer. Of course, the exact amount of catalyst in any particular polymerization recipe will depend upon the specific $HMF_6$ salt used, as well as the mode of polymerization, reaction temperature, and the like.

The vinyl-containing liquid polyepihalohydrins prepared by the cationic polymerization of epihalohydrins using TEOP as the initiator contain with the controlled amount of a chain transfer agent selected from unsaturated carboxylic acids. The amount of acid controls the vinyl content, the molecular weight and viscosity of the product. Usually, the amount employed can be in the range of 0.01 to 10 parts in weight based on one hundred parts of monomers employed. The preferred range is 0.01 to 5 parts.

The polymerization is conducted in the presence of unsaturated carboxylic acids, normally vinyl terminated, containing 3–18 carbon atoms, more usually 3–10, for example, acrylic acid, methacrylic acid, ethacrylic acid, vinyl benzoic acid, vinyl naphthoic acid, itaconic acid and the like are useful in the present process as a chain transfer agent, ideally resulting in a terminal unsaturated group of the formula

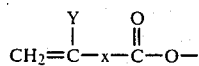

$$CH_2=\underset{\underset{Y}{|}}{C}-x-\underset{\underset{}{}}{\overset{\overset{O}{\|}}{C}}-O-$$

wherein Y is H or alkyl and x is zero, alkylene or arylene, at each end of the polymer chain. The actual number of terminal unsaturated groups may vary from about 1 to about 2 per polymer molecule. The amount of acrylic acid or methacrylic acid typically will vary from about 0.01 weight part to about 10 weight parts per 100 weight parts of epoxide monomer, more preferably from about 0.1 to about 5 per 100 weight parts of epoxide monomers.

The reaction may be carried out at a reaction temperature of 20° to 100° C., preferably in the range of 30° to 80° C. The initiator, TEOP, which is usually dissolved in methylene chloride may be charged to the reactor with one shot, or incrementally batched in, or preferably, metered in at a constant rate over a span of one to 15 hours. The amount of initiator, TEOP, used in the reaction affects the reaction conversion and the yield of product per unit weight of initiator employed.

A typical polymerization technique is as follows. The epoxide monomer(s) and acrylic acid or methacrylic acid are charged to a stirred reactor and preheated to about 40° C. to 80° C. (although reaction temperature may vary from about 0° C. to about 110° C.). The catalyst is added neat or as a solution in a solvent such as methylene chloride. The catalyst may be added all at once but is preferably added incrementally or continuously during polymerization to enable better control of reaction rate and temperature. The acrylic acid or methacrylic acid may also be incrementally batched in or metered in. An inert polymerization solvent or diluent is not required but may be useful to promote efficient mixing and temperature control (the reaction is exothermic). Suitable solvents and diluents include benzene, toluene, hexane, cyclohexane, chlorobenzene and carbon tetrachloride. Reaction time normally may be from about one to 20 hours or more. Reaction pressure is typically autogeneous, but superatmospheric pressures up to 10 atmospheres or more may be employed with the more volatile monomers and solvents/diluents. The reaction may be shortstopped at the desired time using a solution of ammonium hydroxide in isopropanol. If a solvent or diluent has been used, the polymer may be recovered by methods known to the art, such as in a thin film evaporator. Any antioxidant such as tetrabis[methylene(3,5-di-tert-butyl-4-hydroxycinnamate)]methane and an inhibitor such as tert-butyl catechol, methyl hydroquinone, or phenothiazine may be added after shortstopping.

The terminally unsaturated epihalohydrin polymers produced by the above method will vary from fluid liquids to thick semi-solids having typical number average molecular weights ($M_n$) from about 100 to about 100,000. The polymers of this invention will typically have Brookfield viscosity ranging from about 10 Pa.S to about 16,000 Pa.s at 27° C.

These characteristic features enable this material to be particularly useful as a toughener for unsaturated polyester resins system because it co-cures with the unsaturated polyester in addition to its easy handling, and has good compatibility with the resin system.

The vinyl terminated poly(epihalohydrin)s of this invention will be particularly useful in the systems disclosed and described in U.S. Pat. No. 4,101,604, wherein the molding compositions contain an unsaturated polyester resin, the vinyl terminated polyepihalohydrin of this invention, a polymerizable monomer and optionally, reinforcing fibers, catalyst thermoplastic polymers, thickening agents and fillers as disclosed in said patent. The polymers of this invention also find use in castable compositions used as caulks, sealants and the like, as disclosed in U.S. Pat. No. 3,925,330, wherein the compositions comprise the vinyl terminated polyepihalohydrin of this invention, polymerizable vinyl monomer, and a free radical catalyst system. These materials will also find use in forming co-curing compositions with amine terminated liquid polymers of the nature described in U.S. Pat. No. 4,058,657. Further uses including a particular application of these vinyl terminated polyepihalohydrin will be in the preparation of printing plates described in U.S. Pat. No. 4,137,081, wherein the compositions comprise the vinyl terminated polyepihalohydrin of this invention, at least one ethylenically unsaturated monomer, and a photoinitiator.

The following examples illustrate the present invention more fully.

EXAMPLE 1

To prepare the terminally unsaturated epihalohydrin polymer, a 75-gallon jacketed reactor, 492.5 pounds (223.6 Kg) of epichlorohydrin and 7.5 pounds (3.4 Kg) of acrylic acid were charged and the temperature was controlled at 50° C. with steam-water in the jacket. An initiator solution consisting of 58.42 grams of triethyl oxonium hexafluorophosphate (TEOP) and 2300 ml. of methylene chloride was metered into the reactor with a rate of 160 ml. added initially, 300 ml. for the first hour, and 460 ml. per hour in the 2nd thru 5th hours. The reaction was proceeded for an additional one-half hour and was short-stopped with 2300 ml of solution which is made up of 1 to 4 by volume ratio of ammonium hydroxide and isopropyl alcohol. The reaction yielded a 39.1% of theoretical conversion and after stripping off the unreacted epichlorohydrin, the polymer has a Brookfield viscosity of 323.5 Pa.S (323,500 cps) at 27° C. and an iodine number of 6.05.

EXAMPLE 2

The same procedure as described in Example 1 was followed for a reaction which employed 498 pounds (226.09 Kg.) of epichlorohydrin and 2 pounds (908 grams) of acrylic acid with the exception that in this charge the acrylic acid was charged incrementally with 450 grams added initially, and 170, 120, 90 and 80 grams added at subsequent first through fourth hours. The reaction yielded a theoretical conversion of 53.7% and the polymer has a Brookfield viscosity of 4400 Pa.S at 27° C. (4,400,000 cps) and an iodine number of 1.4.

EXAMPLE 3

The same procedure, as described in Example 1, was employed for a reaction which employed 495 pounds (224.73 Kg) of epichlorohydrin and 5 pounds (2.27 Kg) of acrylic acid, except that the acrylic acid was charged incrementally with 3 pounds (1.362 Kg) added initially and 1.5 lbs. (681 grams) and 0.5 pound (227 grams) added at the first and second hour, respectively. The reaction yielded a theoretical conversion of 53.9% and the polymer has a Brookfield viscosity of 776 Pa.S (776,000 cps) at 27° C. and an iodine number of 3.6.

EXAMPLE 4

This example is presented to show the improvement in toughness imparted to an unsaturated polyester sheet molding compound by the use of a liquid polyepichlorohydrin polymer. A compound containing no liquid rubber (control) and a compound containing a liquid acrylonitrile/butadiene rubber (sample 2) are compared with the compound containing liquid polyepichlorohydrin (sample 1.).

TABLE I

| Ingredient (Parts By Weight) | Control | Sample No. 1 | Sample No. 2 |
|---|---|---|---|
| Unsaturate Polyester Resin[1] | 65 | 65 | 65 |
| Low profile additive[2] | 35 | 35 | 35 |
| Calcium Carbonate | 125 | 125 | 125 |
| Zinc Stearate | 4 | 4 | 4 |
| t-butyl Perbenzoate | 1.2 | 1.2 | 1.2 |
| Mg O | 1.75 | 2.05 | 2.15 |
| Liquid Vinyl Terminated[3] Polyether (VTE) | — | 8.0 | — |
| Liquid Acrylonitrile/butadiene[4] | — | — | 8.0 |

[1] A 40% solution of isophthalic unsaturated polyester resin dissolved in styrene monomer supplied by U.S. Steel, Marco Div. as GR-13031.
[2] A 60% solution of polystyrene dissolved in styrene low profile additive supplied by U.S. Steel, Marco Div. under the trade name of GR-63004.
[3] Made by the procedure described in Example 3.
[4] A liquid polymer containing 33% acrylonitrile.

The compositions were prepared by mixing the polyester resin, low-profile additive (both of which were dissolved in a polymerizable monomer), calcium carbonate, zinc stearate and liquid polymer (in samples 1 and 2 only). The liquid ingredients (polyester resin, low-profile additive and rubber) were first mixed together. The liquid ingredients were then mixed with the calcium carbonate and zinc stearate in a Cowles mixer for 15 minutes and then the catalysts were added to the mix and mixing continued for 3 minutes. The M$_g$O was then added and mixing continued for 2 minutes. The compositions were then spread onto sheets of polyethylene and chopped glass fibers (1¼ inch long) was sprayed onto the compositions. The sheets were brought together to form a composite. The composite was passed through compression rollers to effect impregnation of the glass fibers by the resin mix. The quantity of chopped glass fibers used was such that the final sheet molding compositions were a nominal 21% glass. The compositions were then rolled up in the polyethylene and allowed to thicken for about 72 hours at 32° C. The sheets were then cut into sample size and cured for 3 minutes at 150° C. in a 50 ton press. Testing results are shown in Table II.

TABLE II

| Test | Control 1 | Sample No. 1 | Sample No. 2 |
|---|---|---|---|
| % Shrink | 0 | 0 | 0 |
| Barcol Hardness | | | |
| Unnotched Izod (J/cm) | 3.6 | 4.1 | 3.6 |
| Tensile Stress (MPa) | 68.4 | 60.6 | 68.0 |
| Tensile Elongation (%) | 1.76 | 1.70 | 1.88 |
| Tensile Modulus (G Pa) | 10.3 | 8.4 | 7.8 |
| Flexure Stress (MPa) | 119 | 138 | 93 |
| Flexure Strain (cm/cm) | 0.022 | .025 | .019 |
| Flexure Modulus (GPa) | 10.4 | 10.3 | 9.4 |
| Flexure Energy (J) | 1.46 | 1.90 | 1.10 |
| Acoustic Emission (counts) | 8020 | 2570 | 2630 |

The acoustic emission test was devised to measure cracking during a simple cantilever bending load. In it a 3.2 mm thick sample, 38 mm wide and 127 mm long is mounted in a Tinius Olsen Stiffness Tester and bent by applying a weight of 22.7 kg. The sample bent until 70% of the weight was applied to it. The load caused the sample to bend through 6°-7° of measured arc. Commercial acoustic emission equipment such as the Dunegan/Endevco 3000 Series can be used to record the extent of cracking of the samples during this test. Approximately ten samples per test are required for a reliable evaluation.

The above test results show that the toughness is greatly improved in the composition containing vinyl terminated polyepichlorohydrin (Sample 1) as is shown by the acoustic emission cracks, Izod impact test and the flexural energy test. Other important properties such as stress are also improved, while elastic moduli are not adversely effected. Processing characteristics such as shrink, cure rate and maturation are not significantly effected by the use of vinyl terminated polyepichlorohydrin as a toughener. The significant improvements in Izod, acoustic emission and flexural energy were not present in the sample containing the other liquid polymer (Sample 2).

I claim:

1. An unsaturated polyester molding composition comprising:
   (a) An unsaturated polyester resin,
   (b) A polymerizable vinyl monomer, and
   (c) From about 2 to about 30 weight parts of a terminally unsaturated liquid epihalohydrin polymer having the formula

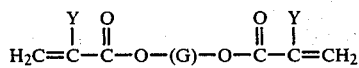

wherein Y is hydrogen or methyl, and G is a polymeric backbone comprising polymerized units of at least one epihalohydrin.

2. A composition of claim 1 wherein the epihalohydrin polymer has a number average molecular weight from about 100 to about 100,000.

3. A composition of claim 2 containing a catalytic amount of a catalyst.

4. A composition of claim 3 wherein said catalyst is selected from the group consisting of benzoyl peroxide, tertiary butyl perbenzoate, cyclohexanone peroxide, tertiary butyl peroxide, tertiary butyl peroctoate, azobisisobutyronitrile and cumene hydroperoxide.

5. A composition of claim 4 containing fiber reinforcement.

6. A composition of claim 5 wherein the level of said fibers is from about 5 to about 70 weight percent by weight of the total composition weight.

7. A composition of claim 6 containing a thermoplastic low profile additive and as a thickening agent an oxide or hydroxide of magnesium or calcium.

8. A composition of claim 7 wherein the low profile additive is a thermoplastic homopolymer of a vinylidene monomer containing from 2 to 12 carbon atoms.

9. A composition of claim 21 wherein epihalohydrin is epichlorohydrin, and said polymerizable monomer is styrene.

10. A composition of claim 9 wherein said backbone G also contains polymerized units of at least one other epoxide having the formula

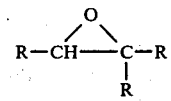

wherein each R is selected from the group consisting of hydrogen, alkyl, alkoxyalkyl, phenyl and unsaturated radicals, but at least one R is hydrogen.

11. A composition of claim 10 wherein said other epoxide is an alkylene oxide.

12. A composition of claim 11 wherein said alkylene oxide is ethylene oxide or propylene oxide.

13. A composition of claim 12 wherein Y is hydrogen.

* * * * *